Sept. 29, 1970  R. B. MERRIFIELD ET AL  3,531,258
APPARATUS FOR THE AUTOMATED SYNTHESIS OF PEPTIDES
Filed Nov. 16, 1967  3 Sheets-Sheet 2
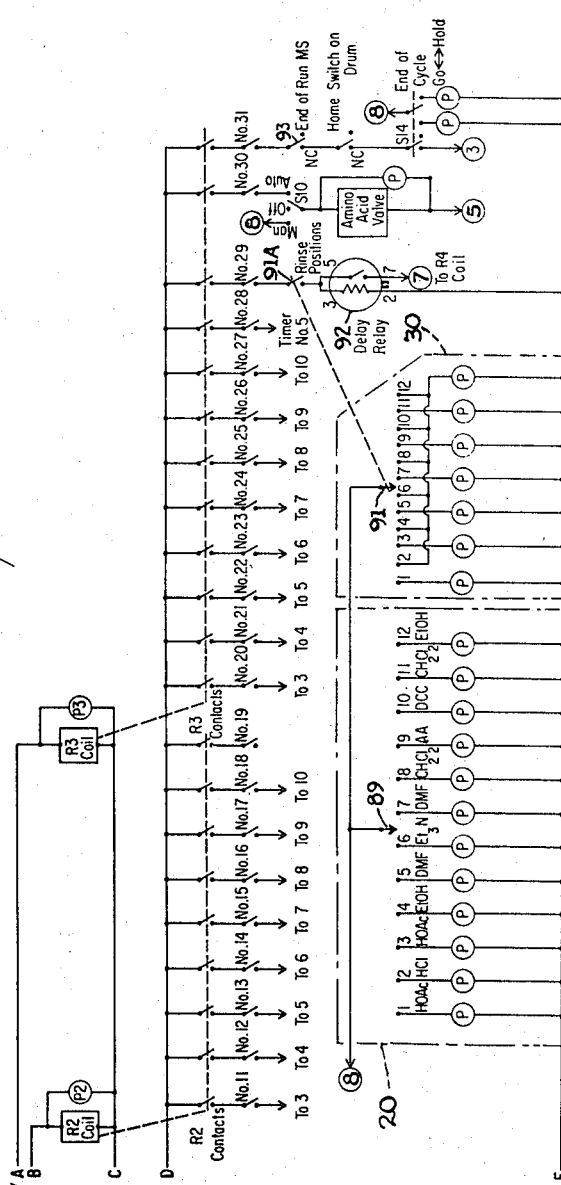
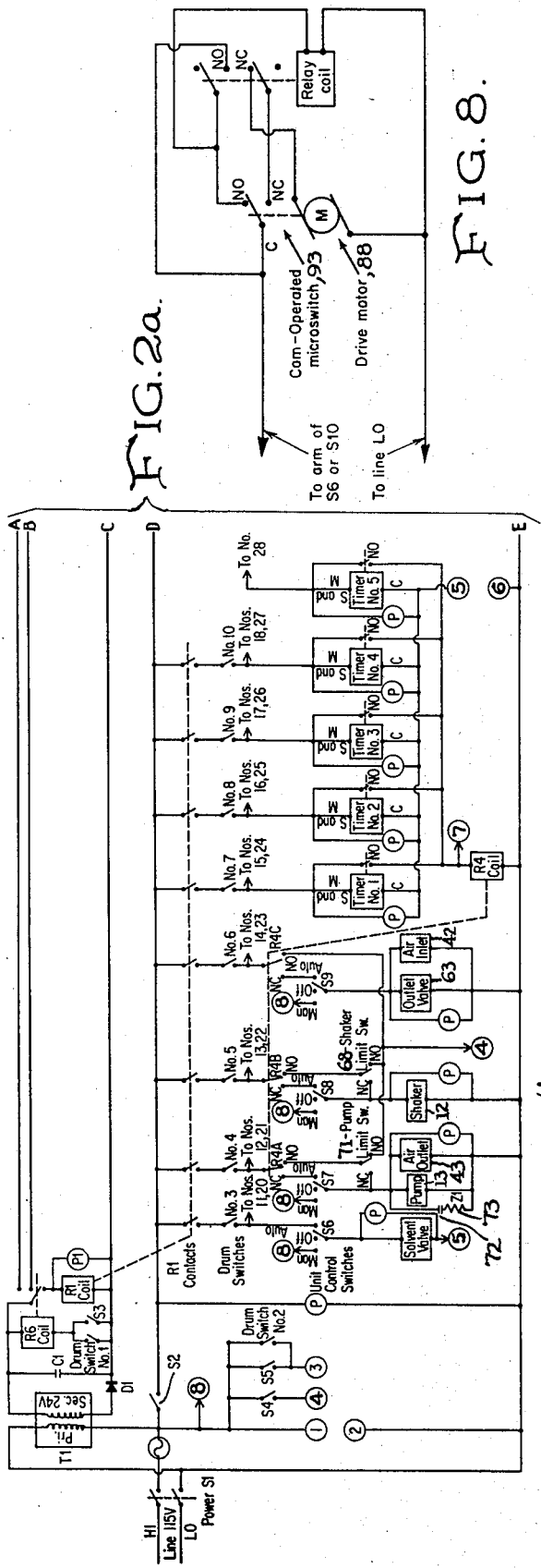
INVENTORS
ROBERT B. MERRIFIELD
JOHN M. STEWART
NILS JERNBERG
BY Sheridan Neimark
ATTORNEY Sept. 29, 1970 R. B. MERRIFIELD ET AL 3,531,258
APPARATUS FOR THE AUTOMATED SYNTHESIS OF PEPTIDES
Filed Nov. 16, 1967 3 Sheets-Sheet 3
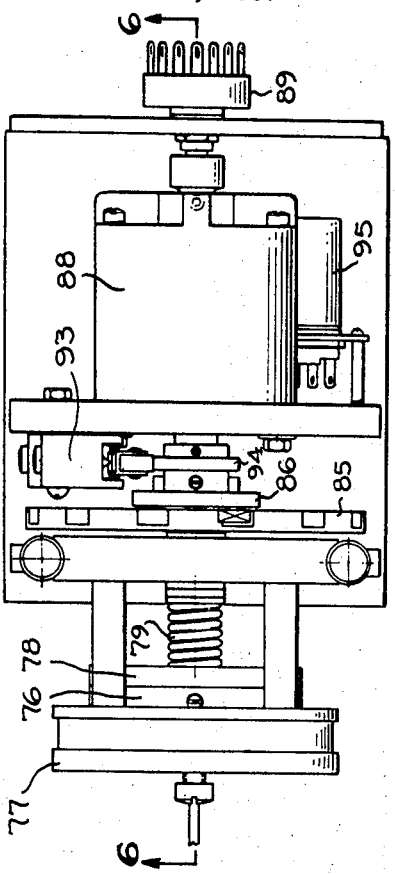
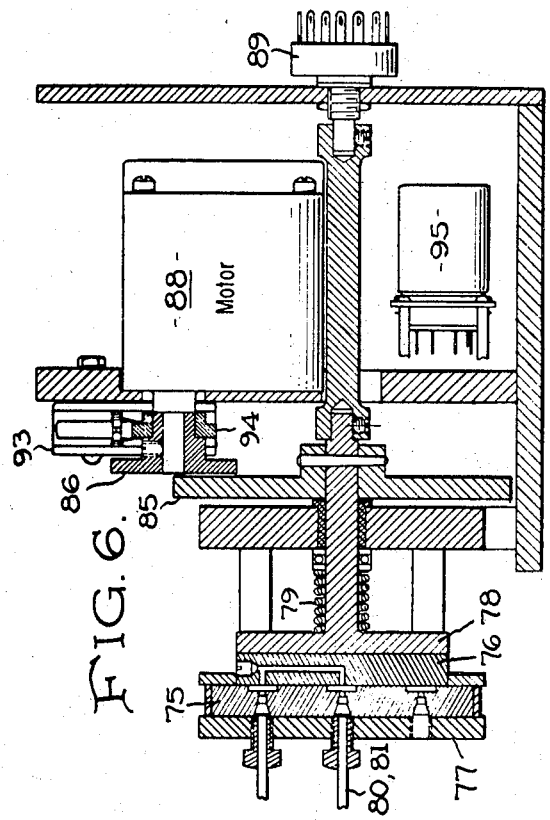
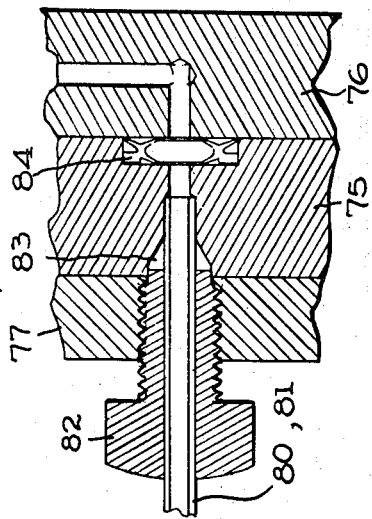
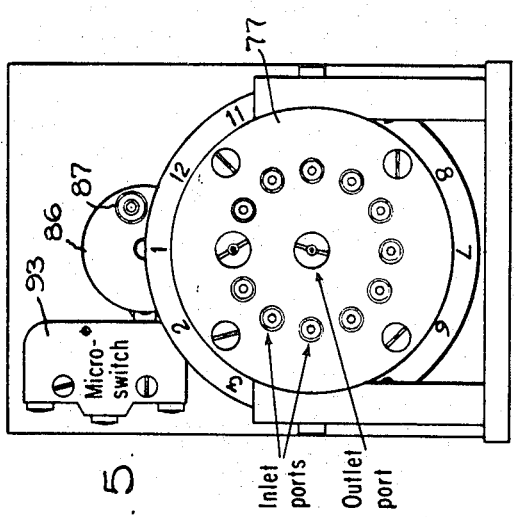
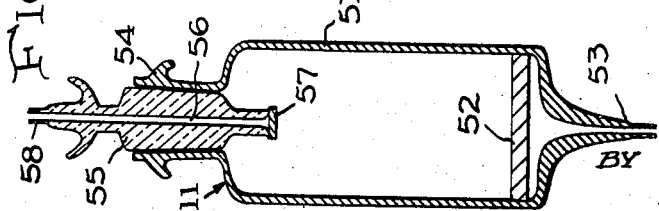
INVENTORS
ROBERT B. MERRIFIELD
JOHN M. STEWART
NILS JERNBERG
BY Sheridan Neimark
ATTORNEY United States Patent Office 3,531,258
Patented Sept. 29, 1970

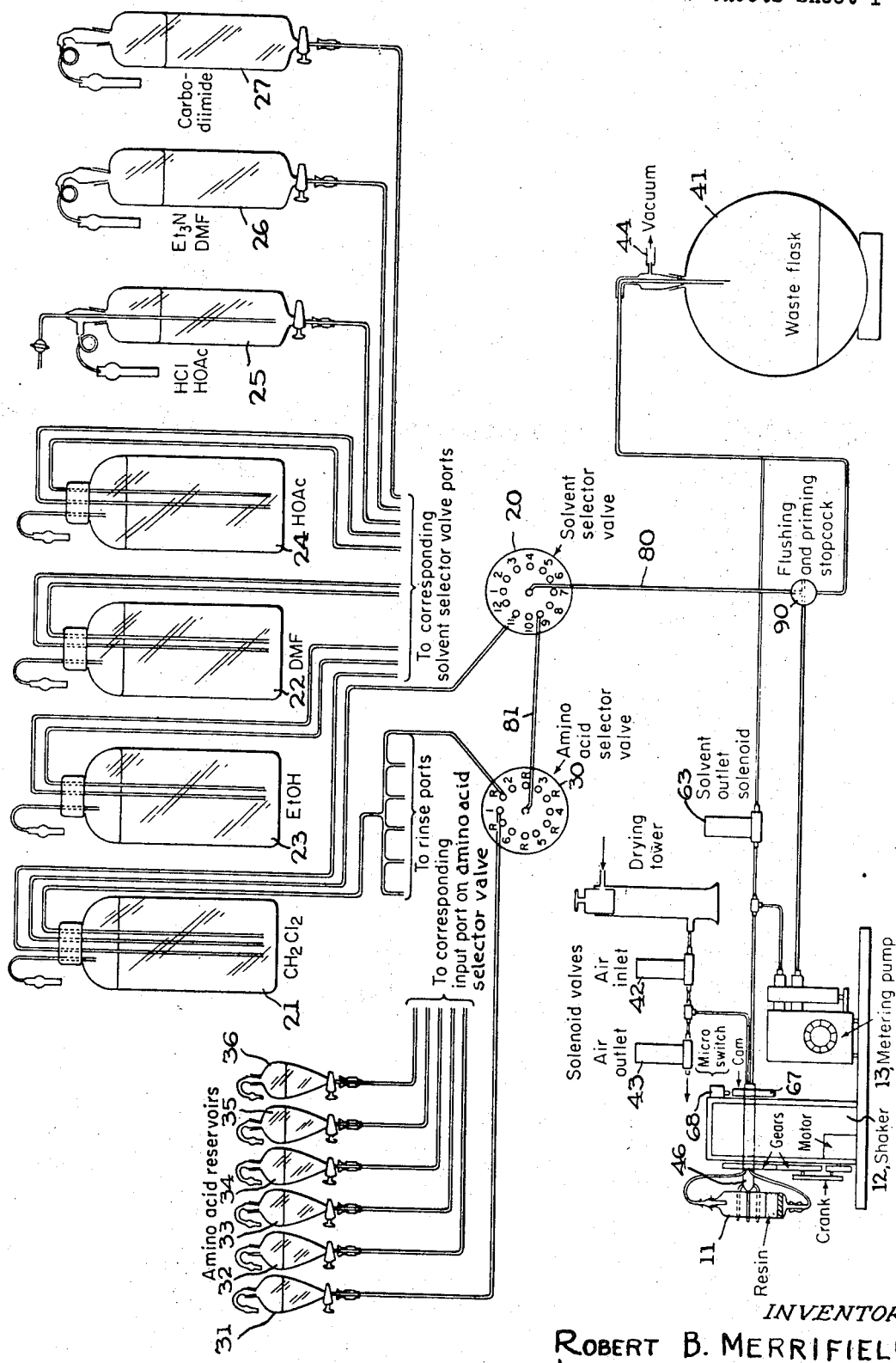

3,531,258
APPARATUS FOR THE AUTOMATED SYNTHESIS OF PEPTIDES
Robert Bruce Merrifield, John M. Stewart, and Nils Jernberg, New York, N.Y., assignors to the United States of America as represented by the Secretary, Department of Health, Education, and Welfare
Filed Nov. 16, 1967, Ser. No. 683,665
Int. Cl. C07c *103/52*
U.S. Cl. 23—252       11 Claims

ABSTRACT OF THE DISCLOSURE

Apparatus to select reagents and solvents by means of solvent and amino acid selector valves, which liquids are transferred by a metering pump from one of a plurality of reservoirs to a reaction vessel which contains peptide-resin. After mixing by a shaker, the solvents, excess reagents, and by-products are removed to a waste flask by vacuum filtration with the operations repeated in prearranged sequence under electrical control until the synthesis of the desired peptide chain is complete.

The present invention relates to the synthesis of peptides and has particular reference to apparatus for the automation of the synthesis of the peptides.

Extensive advances in methods of isolation, purification, analysis, and structure determination of peptides and proteins have outdistanced synthetic achievements in this area. To cope with many of the new problems which have arisen, a greatly accelerated and simplified approach to peptide synthesis is required. Solid phase peptide synthesis was devised and developed with these objectives as guides. An apparatus has been designed in accordance with the present invention for automated peptide synthesis. This apparatus is now able to perform all of the operations involved in the stepwise synthesis of polypeptides.

The method of synthesizing a peptide chain is based on the fact that the chain can be synthesized in a stepwise manner while one end of the chain is covalently attached to an insoluble solid support. During the intermediate synthetic stages the peptide remains in the solid phase and can therefore be manipulated conveniently without significant losses.

The automation of the process carried on by the apparatus of the present invention, described in our article entitled "Instrument for Automated Synthesis of Peptides" appearing in vol. 38 (December 1966) "Analytical Chemistry" at pp. 1905–14, is possible because all of the reactions, including the intermediate purification procedures, are conducted within a single reaction vessel. The apparatus also solves the problem of introducing the proper reagents and solvents into the vessel in the proper sequence at the proper times while maintaining sufficient flexibility to cope with a wide range of reactions and conditions which may occur due to modification of each of the reactions in the synthesis.

During the process the solid support in a chloromethylated styrene-divinylbenzene copolymer bead. The C-terminal amino acid is coupled as a benzyl ester to the resin and the peptide chain grows one residue at a time by condensation at the amino end with N-acylated amino acids. The tert-butyloxycarbonyl group has been the protecting group of choice and activation has usually been by the carbo-diimide or active ester routes.

These, as well as further advantages which are inherent to the invention, will become apparent from the following description, reference being had to the accompanying drawings wherein:

FIG. 1 shows apparatus for the overall process.

FIGS. 2a and 2b comprise parts of a wiring diagram of the electrical controls for the apparatus of FIG. 1;

FIG. 3 is a sectioned elevation view of a reaction vessel;

FIG. 4 is a top view of a rotary solvent selector valve;

FIG. 5 is a front view of the selector valve of FIG. 4;

FIG. 6 is a sectional view taken along line 6—6 of FIG. 4;

FIG. 7 is an enlarged detailed view of tubing connections shown in FIG. 6; and

FIG. 8 is a wiring diagram for connection with the selector valves of the type illustrated in FIGS. 4–7.

In general in the apparatus of the present invention, the proper reagents and solvents are selected by the solvent and the amino acid selector valves 20 and 30 and are transferred by the metering pump 13 from one of the reservoirs to the reaction vessel 11 which contains the peptide-resin. After the desired period of mixing by the shaker 12 the solvents, excess reagents and by-products are removed to the waste flask 41 by vacuum filtration. These basic operations are repeated in prearranged sequence under electrical control until the synthesis of the desired peptide chain is complete. All parts of the apparatus which come into contact with solvents and reagents are made of glass or chemically resistant polymers.

Referring to FIG. 1 there is shown a reaction vessel 11 held in shaker 12 and receiving solvents and reagents and amino acids through metering pump 13. The particular solvent and reagent stored in reservoirs 21–27 is selected and passed to the metering pump 13 through solvent selector valve 20. The particular amino acid stored in amino acid reservoirs 31–36 are selected by amino acid selector valve 30 and also passing through solvent selector valve 20 are sent to reaction vessel 11 by metering pump 13. Connection is also made from reaction vessel 11 waste flask 41. Additional air inlet and outlet valves 42 and 43 respectively and vacuum connection 44 to a vacuum pump (not shown) are also connected to the apparatus shown in FIG. 1.

Reaction vessel 11 shown in greater detail in FIG. 3 consists of a glass cylinder 51 with a coarse grade fritted disc filter 52 at its lower end. The bottom of glass cylinder 51 is constructed so as to leave a minimum of space below filter 52 and is sealed to a male connector 53. The top end of glass cylinder 51 is fitted with a female joint 54 which holds a specially ground stopper 55 containing a 1 mm. inner diameter tube or passageway 56 extending 1.5 cm. into the vessel 11 and ending with a 5 mm. coarse fritted disc filter 57. The outer end of stopper 55 is terminated in a male connector 58.

The vessel 11 is held in shaker 12 by a three fingered hollow-stemmed clamp 46. Solvent and air lines of tubing 61 and 62 respectively of a Teflon material are connected respectively to male connections 53 and 58.

Teflon tubing 61 and 62 passes through a hollow shaft of clamp 46 to avoid entanglement during the shaking operation.

Solvents and reagents from reservoirs 21–27 are pumped into the bottom of vessel 11 by means of metering pump 13 while air is displaced at the top of the vessel 11. Shown in FIG. 1 and also in the wiring diagram of FIGS. 2a and 2b are the solenoid valves controlling this operation. At this point air outlet solenoid valve 43 is open. Solvents are removed at the bottom of vessel 11 by vacuum through vacuum connection 44 with solvent outlet solenoid 63 in the open position. At this point air inlet solenoid valve 42 is opened, allowing the air to be drawn in at the top of reaction vessel 11. The volume of solvent in vessel 11 is adjusted to fill vessel 11 more than half full but to keep the level below the top of the air outlet. Thus, when the vessel 11 is inverted in shaker 12, all of the inner surface is washed with the solvent and any resin adhering to the walls is brought into contact with the reagents. With solenoid valves 43 and 42 closed, an air lock is maintained in the capillary tubing which prevents solvent from escaping when the vessel 11 is inverted. Different size vessels may be accommodated, depending upon the capacity required for different size batches of resin.

Shaker 12 is a device for producing a gentle mixing of the resin and solvents in reaction vessel 11. Shaker 12 may be composed of an eccentric drive from a synchronous motor moving a gear through a 90° arc. This gear will drive a second smaller gear through 180°. This latter gear is attached to clamp 46 which holds vessel 11, and thus repeatedly inverts vessel 11 to mix its contents during the shaking period. A cam 67 mounted on the rear end of the shaft of clamp 46 is so positioned that it activates a microswitch 68 each time vessel 11 comes to the upright position. Microswitch 68 is energized by the electrical control circuitry only at the end of each shaking cycle, and then serves to stop vessel 11 in the vertical position and to step the electrical controls to the next operation as will be described below.

Metering pump 13 is used for all of the pump operations. It is modified somewhat from a standard metering pump in that the standard diaphragms are replaced with Teflon coated diaphragms to withstand the effects of dimethylformamide and other organic solvents. The holdup volume of the pump is minimized by insertion of threaded plugs into the inlet and outlet ports. The holdup is also minimized by stopping the pump each time at end of an exhaust stroke. This is done by means of a microswitch, a pump limit switch 71 shown with the other electrical connections in FIG. 2a. This switch 71 is mounted on the pump back plate so that it is actuated by the lever arm which drives the piston. The total volume pumped is controlled by adjusting both the volume per stroke and the pumping time.

It was found that when pump 13 was turned off, high voltage transients were produced. These transients ruptured the silicon diodes of a bridge rectifier within air outlet solenoid valve 43 which is connected in parallel with the pump electrical connection. Addition of a surge filter, comprising capacitor 72 and resistance 73 in series with each other and in parallel with pump 13 and air outlet solenoid 43, corrected this difficulty.

Solvents are removed from reaction vessel 11 by vacuum filtration through fritted disc 52 at the bottom of vessel 11. The solvent passes out through connector 53 and Teflon tubing 61 to solvent outlet solenoid valve 63 and waste flask 41. If a pressure of about 100 mm. is maintained in waste flask 41 with a vacuum line from vacuum connection 44, the solvent will be removed at the rate of approximately 100 ml. per minute. To insure complete removal of solvents, an excess of time is allowed for each filtration step in the automatic operation. Since in general the diaphragms of solenoid valves are not designed to open against a vacuum, satisfactory operation may be obtained by connecting the solvent outlet solenoid valve 63 in the reverse direction—i.e., with the waste flask 41 connected to the "in" port of the valve.

Reservoirs 21–23 are round bottles fitted with polyethylene screw caps and respectively containing solvents such as methylene chloride, dimethylformamide and ethanol. Glacial acetic acid is stored in its original commercial bottle in reservoir 24 in order to avoid picking up moisture during transfer. Solvent from reservoirs 21–24 is withdrawn through lines of Teflon tubing which are inserted through tight fitting holes in the caps and extend to the bottom of the bottles. Two or three such lines from each bottle are then attached to the appropriate inlet ports of solvent selector valve 20. An additional line from each of the bottles runs to a drying tube containing a substance such as Drierite to replace the solvents with dry air.

Reservoirs 31–36 which are separatory funnels having Teflon stopcocks hold the solutions of tert-butyloxycarbonyl amino acids or esters. The solutions are protected from moisture by small drying tubes packed with a substance such as Drierite which are attached to the funnels. The stems of the funnels are fitted with connectors and attached to Teflon lines which run to the odd numbered positions of the amino acid selector valve 30. The apparatus is fitted with these six funnels, reservoirs 31–36, of sufficient size to hold a supply of amino acids required for a predetermined period of operation of the apparatus.

The remaining three reagents in reservoirs 25–27 are respectively hydrochloric acetic acid reagent, triethylamine dimethylformamide, and carbodiimide, respectively, and are contained in cylindrical separatory funnels. To prevent excessive loss of the volatile solvents by diffusion during storage, the drying tubes are connected to the funnels by coiled lengths of Teflon tubing. These funnels are fitted with Teflon stopcocks and are connected to Teflon outlet lines which run to solvent selector valve 20.

To select the desired solvents and reagents from the different reservoirs, rotary solvent selector valves of Teflon are constructed as shown in detail in FIGS. 4–7. This type of valve is used because it gives a very sharp cut-off of liquid and prevents mixing of one reagent with another. With a manifold in which many reagents flow into a common chamber or line, there is danger of cross-contamination of reagents. Two such valves are necessary, one to select the amino acid derivatives and the second one to select all of the other solvents and reagents.

Selector valves 20 and 30 are constructed from two discs of Teflon 75, 76 with carefully machined faces which are mounted between stainless steel plates 77, 78 and held together under pressure from spring 79. Steel front plate 77 and Teflon disc 75 are stationary and contain a center port and twelve evenly spaced ports around the circumference. The various inlet solvent tubes from the respective reservoirs are connected to the outer ports and the single outlet tube 80 in the case of the valve 20 and 81 in the case of valve 30, is joined to the respective center port of each of those valves. The connections are through a threaded nylon pressure screw 82 and a tapered Teflon ferrule 83. The rear Teflon disc 76 contains a center port and one circumferential port which are joined by a passageway within disc 76. As disc 76 is turned it connects, one at a time, the twelve inlet ports to the central outlet port. A leak-free seal between the Teflon discs 75 and 76 of the valve is obtained by fitting each orifice in the front disc 75 with a sealing ring 84. Pressure spring 79 applies sufficient force to movable disc 76 and pressure plate 78 to seat the x-ring sealing rings 84 in their recesses and bring the two Teflon discs 75 and 76 into light contact. The valve is advanced one position at a time by the Geneva-type intermittent gear drive mechanism of Geneva drive plate 85 moved by Geneva drive wheel 86 having drive stud 87 thereon which is operated by a capacitor motor 88. This drive lacks the locking feature usually found on Geneva drives and thus allows the disc to be turned manually when the drive stud is not engaged. Pressure of spring 79 on Teflon discs 75 and 76 maintains the proper indexing in automatic operation. The rear end of the solvent selector valve shaft turns a twelve point tap switch which indicates the position of the valve at any time by pilot lights P in series with each of the contacts. For convenience these pilot lights are mounted on a control panel in the electrical control unit shown in FIGS. 2a and 2b.

Valves 20 and 30 are designed to move in only one direction and therefore cannot select solvents at random. Therefore the twelve inlet solution lines must be connected to each of the solvent selector valves 20 and 30 in the sequence in which they are required during the synthesis.

The outlet of the amino acid selector valve 30 is connected to line 81, which is connected to one of the outer ports (No. 9 in FIG. 1) of the solvent selector valve 20, and the outlet tube 80 of solvent selector valve 20 is connected to the metering pump 13 through a three-way stopcock 90. The remaining arm of the stopcock 90 is connected to waste flask 41 and is used to flush and prime the solvent and reagent lines.

The amino acid valve 30 also contains twelve inlet ports, with the six amino acid reservoir 31–36 being connected to the odd numbered positions, while alternate ports are connected to a rinse solvent to flush the line between the two valves and thereby prevent contamination by the previous amino acid solution. The six rinse lines are all supplied with methylene chloride from a six-arm glass manifold connected to one of the tubes from reservoir 21. Instead of the single-gang top-switch 89 shown in FIGS. 4 and 6, for the solvent selector valve 20, the amino acid valve shaft is fitted with a twelve point two-gang tap-switch 91 and 91a. The first gang 91 operates pilot lights P to indicate the position of the valve 30. The odd numbered positions are connected to pilot lights in series with numbered amino acid connections to reservoirs 31–36, while the even numbered positions are all connected in parallel to a single "rinse" pilot light P. The second gang 91a has all of the even numbered rinse positions wired together. These are used in conjunction with a time delay relay 92 to perform the rinse function after each amino acid is pumped. Operation of this function is described later. The odd numbered contacts of 91a are not used. The amino acid valve 30 also bears a microswitch 93 so positioned that it is actuated by a pin in the Geneva drive plate 85 when the valve is in position 1 (first amino acid). This "end of run" switch 93 serves to stop the entire instrument after the coupling of the sixth amino acid is completed.

The wiring diagram for the Geneva drive of the solvent and amino acid selector valves is given in FIG. 8. The shaft of motor 88 bears a cam 94 which actuates a microswitch 93 of a roller type construction, once each revolution. The cam 94 is positioned so that the switch 93 is actuated and closes the NO contact just as the drive stud 87 is emerging from the slot in the Geneva drive plate 85 after advancing the valve 20 or 30 to the next position. The microswitch 93 is actuated only momentarily, as the inertia of the motor 88 carries the cam 94 off the switch 93 roller and restores the NC circuit. At the beginning of the Geneva drive cycle, the motor 88 is energized through the NC contact of microswitch 93 and the NC contact of the relay 95. When the shaft of motor 88 has made one revolution to advance the valve 20 or 30 to the next position, actuation of microswitch 93 by cam 94 stops motor 88 and energizes relay 95. The NO contact of the relay 95 now serves to hold the relay 95 energized and prevent the motor 88 from advancing further until the source of power has been interrupted by the electrical control circuit. The return lead from the Geneva drive of the selector valves 20 and 30 through the low side of the line passes through terminals 5 and 6 of the electrical control device. These terminals are connected to a switch which is opened each time the control unit is stepped. This allows the valve drive relay 95 to open and makes it possible to operate the same selector valve on two successive steps if desired. This arrangement is necessary because microswitches on a stepping drum do not necessarily open during stepping when operation in two successive positions is called for.

The proper sequential operation and timing of the previously described components is controlled by an electric control circuit. Although any of several different types of step switching may be used which will accomplish the sequential operation of the circuit shown in FIG. 2, one type may contain a revolving drum with microswitches positioned thereunder and contacting means positioned on said drum. The drum can be driven by a Geneva type drive which advances the drum by steps. Means to actuate microswitches can be attached to positions on the drum. These microswitches will in turn control the various operating units (pump 13, shaker 12, or valves 20 and 30) and timers. At the end of a selected time for each step in the process the timer furnishes a signal to cause the drum to move to the next position where a new combination of switches will be actuated. A position of the drum could be advanced manually one step at a time by depressing push button switch S–4 or continually by depressing switch S–5. All of the operating units of the instrument can also be operated manually (independently of the automatic operation) by means of the unit control switches S–6 through S–10.

The electrical control circuit receives its power through a 115 volt line and through the 24 volt DC system provided by transformer T–1, diode D–1, and capacitor C–1. A rotary stepping relay R–6 causes each of the relays R–1, R–2 and R–3 to be energized in turn with the pilot lights P–1, P–2 and P–3 indicating which relay is energized. The stepping relay R–6 need be wired only as a three step device. It can be advanced manually by push-button switch S–3 or automatically by drum switch #1 which is actuated by the drum itself at a predetermined step in the sequence. Drum switch 2 is also actuated at the same step as the actuation of drum switch #1 in order to advance the drum to step #1. Thus, automatic operation begins at step #1 of the drum with relay R–1 and the first bank of drum switches (numbers 3–10) energized. At a predetermined time, step relay R–6 advances one step and the drum makes another revolution with relay R–2 and drum switches 11–19 energized. At the same predetermined step on the second revolution, relay R–6 steps again and during the third revolution of the drum relay R–3, and drum switches 20–31 are energized. When the operation is completed at a predetermined step of the third revolution, further operation is controlled by the position of the end of cycle switch S–14. If switch S–14 is in the "hold" position, which is the open position, the operation stops. If switch S–14 is in the "go" position, or closed position, power is applied to terminal 3 of the electrical control device, causing it to step continuously back to the "home" position or first step of the drum. The second pole of switch S–14 energizes pilot lights which indicate the setting of switch S–14. During this "return to home" phase, relay R–6 is stepped once, thus returning the electrical control to the beginning of the operation with relay R–1 and drum switches 3–10 energized. The electrical control then proceeds to carry out another cycle of the synthesis.

In the details of the wiring of the electrical controls of the present apparatus, the following connections in FIG. 2 are made as follows. These connector numbers are circled in FIG. 2 and are connected as follows:

1 and 2 supply power for a drive motor;
3 is to produce a drum continuous stepping operation;
4 is to produce a drum single step operation;
5 and 6 connect to an NC microswitch which opens during each stepping operation;
all terminals 8 are connected together to furnish power to operating units and pilot lights when the drum is not operating;
and 7 indicates the connection of time delay relay 92 to the R–4 coil.

All of the operations of the automatic apparatus are time controlled. All of the operations except the rinse steps are controlled by timers Nos. 1–5. Terminals S (solenoid) and M (motor) of the timers are connected together to the appropriate drum switch while the terminals C (common) of all of the timers are connected together and then to terminal 5 of the control device. This use of the step-interrupted return circuit is necessary to reset the timer in those cases where the operation requires use of the same timer on two successive steps. When a given timer is running and the preset time elapses, the normally open contacts of the timer control switch close and line voltage is applied to the coil of R–4. Thus, the timers do not cause the drum to step directly but rather actuation of coil R–4 causes the power being supplied to an operating unit to be switched to terminal 4, thus causing the drum to step. When the operating unit in use is the outlet valve, line voltage is switched by R–4C directly to terminal 4 and the drum steps. When the operating unit is either the pump or shaker, however, the drum does not step until the operating unit limit switch 71 or 68 is actuated—i.e. until the pump piston reaches the end of an exhaust stroke or the shaker brings the vessel to the upright position. In these cases the energization of R–4 only brings the proper limit switch 71 or 68 into the circuit and when the limit switch is actuated the drum steps.

The rinse steps which flush the amino acid valve 30 and tubing with methylene chloride to prevent cross-contamination of successive amino acid residues are not timed by one of timers Nos. 1–5 but rather by time delay relay 92. When the amino acid pumping step is completed the drum advances to the step where drum switches for the pump switch (#21), amino acid selector valve switch (#30), and the rinse switch (#29) are actuated. Both the pump and the amino acid valve begin to operate. Both these devices are operated by motors and the cam on the amino acid valve Geneva drive is positioned so that the actual movement of the valve occurs during the second half of the motor rotation. Since the pump always stops at the end of an exhaust stroke, during the first intake stroke of the pump the valve will still be stationary and in the amino acid position. During the following exhaust stroke of the pump, the actual movement of the valve disc occurs, advancing it to the rinse position. This synchronization assures that the pump will not be on an intake stroke when the disc is in motion. When the amino acid valve reaches the rinse position the associated tap switch (gang 2, S–16B) closes and applies power from drum switch 29 to the delay relay 92. After ten seconds, delay relay 92 closes and applies power through terminal 7 to coil R–4 and the drum steps when the pump reaches the end of its next exhaust stroke. A similar scheme is used to provide a brief rinse after the diimide pumping step, although in this case the timing operation of relay 92 begins immediately, since the amino acid valve is already in the rinse position, and S–16B is closed. During the first pump exhaust stroke the solvent selector valve advances to position 11 to flush the line with methylene chloride.

The solvent and amino acid selector valves 20 and 30 do not incorporate a device to signal the drum to step. Therefore, these valves are always used in conjunction with the timer and another operating unit (pump 13, shaker 12 or solvent outlet solenoid 63) which will furnish the necessary stepping signal.

OPERATION OF THE APPARATUS

Several preliminary operations are necessary before the synthesis of a peptide can be started. First, the supporting resin containing the C-terminal amino acid of the proposed peptide chain must be prepared and analyzed. This is done by esterification of a chloromethylated copolymer of styrene and divinylbenzene with the tert-butyloxycarbonyl (t.-BOC) amino acid. The product is freed of very fine particles of resin by flotation in methylene chloride to prevent subsequent clogging of the fritted discs 52 and 57 of reaction vessel 51. A sample of the vacuum-dried product is hydrolyzed in a 1:1 mixture of dioxane and 12 N HCl and the liberated amino acid is measured quantitively on an amino acid analyzer. The amino acid content is used to calculate the amounts of subsequent amino acid derivatives and dicyclohexylcarbodiimide reagent which will be used in the synthesis. The best range of substitution has been 0.1 to 0.3 mm. per gram. The tert-butyloxycarbonyl amino acid-resins are usually prepared in advance and are stored until needed.

The appropriate solvent reservoirs are filled with glacial acetic acid, methylene chloride and commercial (99.5%) absolute ethanol. N-N-Dimethylformamide is freed of dimethylamine and formic acid by shaking with barium oxide and distillation under reduced pressure. The 1 N HCl-acetic acid solution is prepared by adding 700 ml. of glacial acetic acid to the storage separatory funnel and passing in a slow stream of anhydrous hydrogen chloride. Samples are withdrawn at the bottom and titrated for chloride by the Volhard method. This solution, when protected by the long coil of capillary tubing and drying tube, is stable for several weeks without a significant decrease in concentration. The triethylamine reagent is prepared by mixing 50 ml. of triethylamine with 450 ml. of purified dimethylformamide.

The solvent lines from the reservoir 21–27 are filled one at a time by turning solvent selector valve 20 to the corresponding position and applying suction through flushing and priming stop-cock 90.

The metering pump is calibrated by pumping methylene chloride into a graduated cylinder for a measured period. This operation is carried out with the electrical control unit with timer #2 set for one minute. The pump rate (approximately 20 ml. per minute) can be varied by changing the length or stroke of the piston.

The holdup volume of the system between solvent selector valve 20 and the bottom of reaction vessel 11 is determined by filling the line with the HCl-acetic acid reagent (port 2), turning the valve to the acetic acid line (port 3) and pumping until all of the HCl has been flushed out. The effluent is titrated for chloride and the holdup volume is calculated. In the system presently in use it was 4.2 ml.

The reaction vessel is loaded with a weighed amount of the t.-BOC amino acid-resin (2 to 4 grams for a small, 45 ml. capacity vessel). The stopper is lubricated with silicone high vacuum grease and secured in place with springs, and the inlet and outlet lines are attached. In the synthesis three equivalents of each t.-BOC amino acid derivative are used per equivalent of the first amino acid on the resin. The calculated quantity of each of the first six amino acids is dissolved in 7 ml. of methylene chloride, filtered if necessary, and placed in the amino acid reservoirs in the proper sequence. Because of poor solubility in methylene chloride, t.-BOC-nitro-L-arginine is first dissolved in 2 ml. of dimethylformamide and diluted with 5 ml. of methylene chloride, while t.-BOC-im-benzyl-L-histidine is dissolved in 7 ml. of pure dimethylformamide. The t.-BOC amino acid-p-nitrophenyl esters are dissolved in 16 ml. of pure dimethylformamide. During the automated synthesis the amino acid solutions are pumped completely into reaction vessel 11 and a precise concentration therefore is not required. The dicyclohexylcarbodiimide solution, on the other hand, is metered by pump 13 and the concentration of the reagent must be calculated for each run. Since the holdup volume and the total volume pumped are known, the actual volume of diimide solution delivered into the vessel 11 can be calculated. The required quantity of dicyclohexylcarbodiimide is dissolved in this volume of methylene chloride. The total volume of solution prepared at one time depends on the number of amino acids to be added.

The drum is stepped manually by use of switch S–5 to step 2 and relay R–6 is stepped to the desired position by using switch S–3. The timers are set for quantities discussed above, as follows: No. 1. 30 seconds; No. 2. 60 seconds; No. 3. 90 seconds; No. 4. 10 minutes; No 5. 20 minutes. The amino acid and solvent selector valves 30 and 20, respectively are set to position 1. The pump is set for 20 ml. per minute. The unit control switches S–6 through S–10 are placed in the automatic operation position and the end of cycle switch S–14 is placed in the "go" position. Closing of switch S–2 starts the automatic synthesis.

FUNCTIONING OF A TYPICAL DIIMIDE CYCLE

The instrument first washes the resin three times with acetic acid by means of three sets of pumping, shaking, and outlet steps. As described above, pump 13 always stops at the end of an exhaust stroke to minimize solvent mixing, and shaker 12 always stops with vessel 11 in the upright position to make the following filtering (outlet) step possible. During the third of these outlet steps, solvent valve 20 advances to position 2, and the HCl-acetic acid reagent is then pumped into vessel 11. The 30-minute reaction period necessary for complete removal of the tert-butyloxycarbonyl protecting group is obtained by use of three successive 10-minute shaking steps.

After this deprotection step, the resin is washed three times with acetic acid to remove hydrogen chloride, three times with ethanol to remove acetic acid, and three times with dimethylformamide. A 10-minute shaking period with triethylamine in dimethylformamide serves to neutralize the hydrochloride of the amino acid on the resin, thus liberating the free amine in preparation for coupling with the next protected amino acid. Triethylammonium chloride and excess triethylamine are removed by three washes wih dimethylformamide, and prepare the resins for the coupling step. The t.-BOC amino acid solution is then pumped into vessel 11 in a 30-second (timer #1) pumping step. On the next step (rinse), the pump draws one more stroke of air, then three strokes of methylene chloride to flush the amino acid line.

The next step is a 10-minute shaking operation to allow the amino acid to soak into the resin beads. During this step, the solvent valve 20 advances to the diimide (No. 10) position. At the next step, diimide solution is pumped for 30 seconds, and then the rinse step adds one more stroke of diimide solution and three strokes of methylene chloride. The coupling reaction then takes place during a 2-hour (timer #5) shaking cycle. After the coupling reaction, by-products and excess reagents are removed by three washes in methylene chloride and two washes in ethanol.

If the end-of-cycle switch S–14 is set in the hold position, the instrument stops after the third ethanol wash and the resin is left suspended in ethanol. If S–14 is in the "go" position, the drum returns to the beginning of the cycle and proceeds to carry out the next cycle of operation. The apparatus will continue to operate for approximately 24 hours until the coupling cycle for the sixth amino acid has been completed. Then the end-of-run microswitch 93 stops the apparatus. To continue the run, the amino acid reservoirs 31–36 are washed (solvents are added to the reservoirs and drawn through the amino acid valve 30 and the solvent valve 20 to the waste flask 41 through the three-way stopcock 90). The amino acid reservoirs 31–36 are then refilled with the proper new solutions, the reagent and solvent reservoirs 21–27 are replenished if necessary, the amino acid valve 30 is set by switch 35 to position 12. The drum is then stepped manually back to step 1 to start the coupling of the next six amino acid residues.

Using the apparatus of the present invention, an active ester coupling cycle may be accomplished instead of a diimide cycle using some different solvents and reagents with a change in order and setting of timers.

When the synthesis of the desired amino acid sequence has been completed, the peptide-resin is removed from the reaction vessel 11 with the aid of ethanol, filtered, and dried. Weight gain of the resin during the synthesis provides an indication of the amount of peptide incorporated. The peptide is cleaved from the resin with HBr-trifluoroacetic acid and subjected to a suitable purification procedure.

In addition to the circuitry shown, in areas where power interruptions are common, a safety relay may be incorporated into the circuit to prevent the instrument from continuing upon restoration of power. This is desirable because of the design of the amino acid and solvent selector valve circuits. These valves advance one position each time they receive power, requiring three seconds for this operation, and then hold until the power is removed. During automatic operation these valves are in the holding phase for considerable lengths of time. If even an instantaneous power failure should occur during a holding period, upon restoration of power, the valve would again advance and become completely out of phase with the remainder of the program. It is preferable to stop the instrument entirely. Other controls which can be incorporated are a solvent level control for the reaction vessel 11 to circumvent possible pump malfunction or exhaustion of solvent; interlocking controls to ensure that the solvent and amino acid valves are in the proper position during operation of the apparatus; a vacuum sensor in the waste receiver flask 41 to prevent possible failure of the filtering operation; and a recorder to make a permanent record of the performance of each operation of the automatic cycle for help in trouble shooting possible failures.

The automated apparatus of the present invention has been successfully utilized for the synthesis of several peptides among which were bradykinin, several analogs of this nonapeptide plasma kinin, angiotensinylbradykinin, a decapeptide from tobacco moasic virus protein and insulin. There was, in each case, substantial saving of time and effort in the synthesis of these peptides and the overall yields were better than those usually achieved by conventional manner. This apparatus should have even additional advantages as synthesis of longer peptides is undertaken. The flexibility with has been incorporated into the design of this apparatus should facilitate its application to the automated synthesis of other polymers in addition to the specific application described here for the synthesis of peptides.

It will be obvious to those skilled in the art that various changes may be made without departing from the scope of the invention and the invention is not to be considered limited to what is shown in the drawings and described in the specification.

What is claimed is:

1. Apparatus for the automated synthesis of peptides comprising
   a plurality of reservoirs for amino acids and a plurality of reservoirs for solvents and reagents,
   an amino acid selector valve connected to each of said plurality of reservoirs for amino acids and to at least one of said plurality of reservoirs for solvents and reagents,
   a solvent and reagent selector valve connected to said plurality of reservoirs for solvents and reagents and to the outlet of said amino acid selector valve,
   a reaction vessel connected to the outlet of said solvent and reagent selector valve,
   shaker means to hold and invert said reaction vessel,
   pumping means connected to said reaction vessel to meter the flow from said reservoirs to said vessel,
   waste disposal means connected to said reaction vessel,
   and electrical control means connected to said selector valves, shaker means and pumping means for their operation in a sequential manner,
   said electrical control means including
      switching means to start and stop said shaker means and said pumping means, connected to said respective means and to said selector valves,
      stepping relay means connected to said switching means to operate said switching means in a predetermined sequence,
      and timing means connected to said switching and stepping relay means.

2. The apparatus of claim 1 further characterized by said stepping relay means including
   a main stepping relay connected for three steps,
   first, second, and third stepping relays connected for energization in turn by said main stepping relay,
   first, second, and third groups of switches connected respectively to said first, second and third stepping relays for operation thereby.

3. The apparatus of claim 1 further characterized by said shaker means including
   hollow clamping means having a hollow shaft passing through said shaker means through which pass connections from said reaction vessel.

4. The apparatus of claim 1 further characterized by said reaction vessel having openings near the top and bottom ends and including
   a fritted disc filter near the bottom exit from said reaction vessel,
   a second fritted filter at the entrance to said reaction vessel.

5. The apparatus of claim 1 further characterized by solenoid control air inlet and air outlet valve means connected to the opposite end of said reaction vessel from the connection to said solvent and reagent selector valve.

6. The apparatus of claim 1 further characterized by each of said selector valves including
   a stationary disc having a center port and a plurality of port spaced around said center port extending through said disc,
   a rotating disc having a center port connected with a port spaced from said center port so as to coincide with each of said plurality of ports in turn in said stationary disc,
   and means to rotate said rotating disc in a stepping movement.

7. The apparatus of claim 6 further characterized by said stationary disc and said rotating disc being of a substance like Teflon.

8. The apparatus of claim 6 further characterized by said means to rotate said rotating disc including
   a metal drive plate pressed against said rotating disc,
   spring means to hold said drive plate against said rotating disc,
   a drive shaft connected to said metal drive plate,
   and drive means to rotate said drive shaft.

9. The apparatus of claim 8 further characterized by said drive means including
   a Geneva drive plate mounted on said drive shaft,
   a Geneva drive wheel mounted for rotation adjacent to said Geneva drive plate,
   a drive stud mounted on said Geneva drive wheel for intermittent contact with said Geneva drive plate during rotation of said Geneva drive wheel,
   and a motor means connected to said Geneva drive wheel for rotation thereof.

10. The apparatus of claim 9 further characterized by said drive means further including
    cam means mounted on said Geneva drive wheel,
    and a switch in operative contact with said cam means to control operation of said motor means.

11. The apparatus of claim 1 further characterized by vacuum means connected to said waste disposal means,
    and flushing and priming stopcock means connected to said waste disposal means, said solvent and reagent selector valve, and said reaction vessel.

References Cited

UNITED STATES PATENTS

| | | | |
|---|---|---|---|
| 3,334,969 | 8/1967 | Catravas | 23—253 X |
| 3,373,872 | 3/1968 | Hrdina | 23—253 X |

OTHER REFERENCES

Merrifield, "Automated Synthesis of Peptides," Science, vol. 150, pp. 178–185, 1965.

MORRIS O. WOLK, Primary Examiner

R. E. SERWIN, Assistant Examiner

U.S. Cl. X.R.

23—253, 259; 260—112.5